Nov. 10, 1959 — E. T. HOLLAND, JR — 2,911,802
CONVEYOR FOR COOLING ROOM
Filed June 1, 1955 — 2 Sheets-Sheet 1

INVENTOR
*Edward T. Holland, Jr.*
BY
*Curtis Morris & Safford*
ATTORNEYS

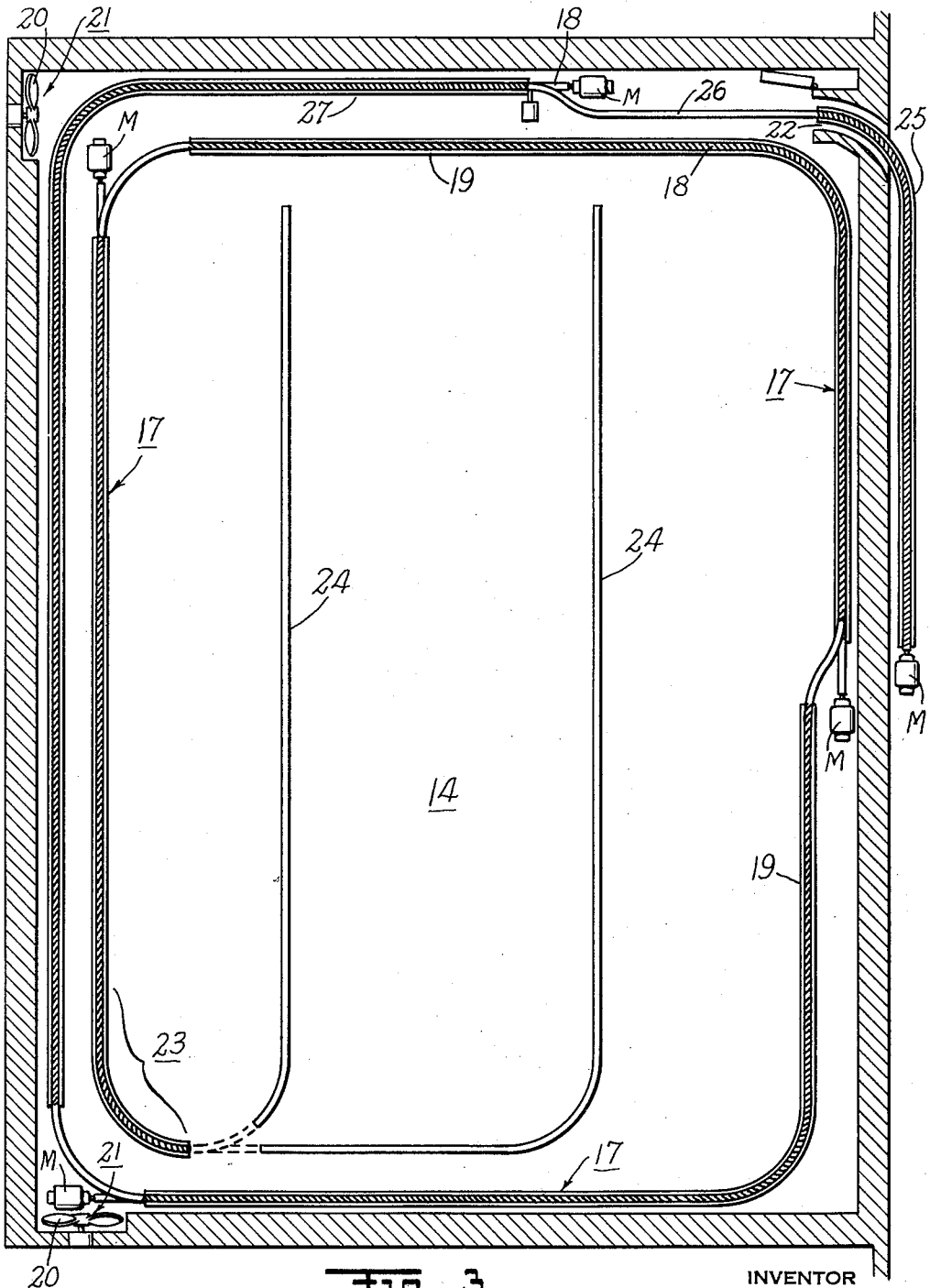

United States Patent Office 2,911,802
Patented Nov. 10, 1959

2,911,802

CONVEYOR FOR COOLING ROOM

Edward Thorne Holland, Jr., Tenafly, N.J., assignor to Cherry-Burrell Corporation, Cedar Rapids, Iowa, a corporation of Delaware Application June 1, 1955, Serial No. 512,361

5 Claims. (Cl. 62—382)

This invention relates to a system for conveying articles and particularly to a system for conveying food, such as ice cream, from a warm production or packing zone into and through a very cold zone.

An object of this invention is to provide a simple, efficient and less costly system for handling articles, packages and the like that are to be frozen or hardened. A further object is to provide an improved system for storing articles or products while they are being subjected to a heat transfer operation. These and other objects will in part be apparent and in part be pointed out hereinafter.

In the manufacture of ice cream, it is customary to fill the empty ice cream packages from a large vessel containing soft ice cream at a temperature of roughly 20° F. After filling, these packages are wrapped or otherwise sealed and then taken to a very low temperature hardening room where they are to be further frozen or hardened.

There is a correlation between the speed of freezing of the soft ice cream and the size of ice crystals formed in it, this being typical of other foods as well. The faster the freezing, the smaller the ice crystals and consequently, the better the quality of the ice cream product. For this reason, therefore, it is necessary to provide for sufficient circulation of the cold air of the hardening room around the individual packages. This means that the packages must be separately or loosely stacked so that the air can pass freely between them and thus extract the heat as rapidly as possible. Additionally, loose stacking is desirable in order to prevent the mashing or deforming of the relatively soft packages by their own weight.

The need for loose stacking has resulted in the necessity for providing racks or shelves in the hardening room for holding the individual packages in spaced apart relation. These shelves are usually loaded and unloaded manually and access corridors are provided between them so that the workmen can reach all the shelf areas in the hardening room. These corridors together with the parts of the hardening room which are too high or too low to be reached conveniently and which do not have shelves, constitute totally wasted space so far as the freezing or hardening of the ice cream is concerned. Moreover, because the shelves stacked with packages themselves act as barriers to the free circulation of air in the hardening room, and since the air does not circulate uniformly to the extreme corners of the room, ice cream packages on different shelves tend to freeze at different rates. Hence even the usable space is utilized inefficiently.

One further disadvantage of a shelf-arranged hardening room which should be mentioned is that, to make most efficient use of the workmen who have to load and unload the shelves, a number of packages should be accumulated in the production zone and then taken as a group to the hardening room. Continuous operation is thus hampered and less than maximum utilization of the space available in the hardening room is obtained. Moreover, the ice cream packages while standing in the production zone, which for the convenience of the workers must be kept near 70° F., are unavoidably warmed, possibly to the point of impairment of quality of the final product, and increasing the necessary hardening time.

The present invention overcomes the above difficulties by means which, for a given package handling capacity, not only reduces the necessary manual labor, but also reduces the wastage of space in the hardening room and makes possible continuous rather than batch by batch operation, and most importantly, greatly reduces the time required for thoroughly freezing the contents of the packages. Moreover, the packages are frozen in substantially equal times, rather than some more slowly than others, and therefore the quality of the final product is greatly improved and also more nearly uniform.

In the illustrative embodiment of the present invention, packages of ice cream to be frozen are carried by an overhead conveyor from a production zone into and through a low temperature hardening room. Otherwise inaccessible space near the ceiling of the hardening room is fully utilized. The speed of freezing of the packages is greatly increased because as the packages are transported into and through the hardening room, they are led initially counter to the direction of an air blast in the room thus increasing the relative velocity of the air past them. Moreover, because the packages are led in spaced from each other, the air has a chance to reach each of them on every side. So effective is this way of handling the packages that their freezing time is reduced in the order of magnitude to one-fifth the time required in a shelf-arranged hardening room.

After the packages have been carried by the moving conveyor through a preliminary cooling circuit in the hardening room, they are shunted onto overhead spur rails where they stand during the remainder of the freezing cycle. The cold air continues to circulate around them and they continue to cool at a rapid rate. After the packages are thoroughly frozen they can be manually unloaded from the spur rails and close stacked in an appropriate place. The manpower required to do this is far less than that required to load and then unload the packages from shelves and this saving in human effort is particularly important where the working area is so cold and working consequently so difficult.

A particularly advantageous conveyor structure for carrying the packages through the above described cycle is disclosed and claimed in a copending application. However, for the sake of completeness, this structure will be briefly described herein.

This conveyor has a unique package supporting rail upon which hooks supporting the racks for carrying the packages slide, being driven along the rail by a screw like drive shaft which lies within the rail just deep enough so that the tops of its threads extend above the rail and contact the package hooks. When the feedshaft is rotated the spiral threads move the hooks and the packages are propelled along the rail.

A fuller understanding of the present invention together with a better appreciation of its many advantages will best be gained from a study of the following description given in connection with the accompanying drawings in which:

Fig. 3 is a plan view of the system shown in Fig. 1; and

Fig. 4 is an end view of the conveyor modified to support a tray or the like.

Figure 1:
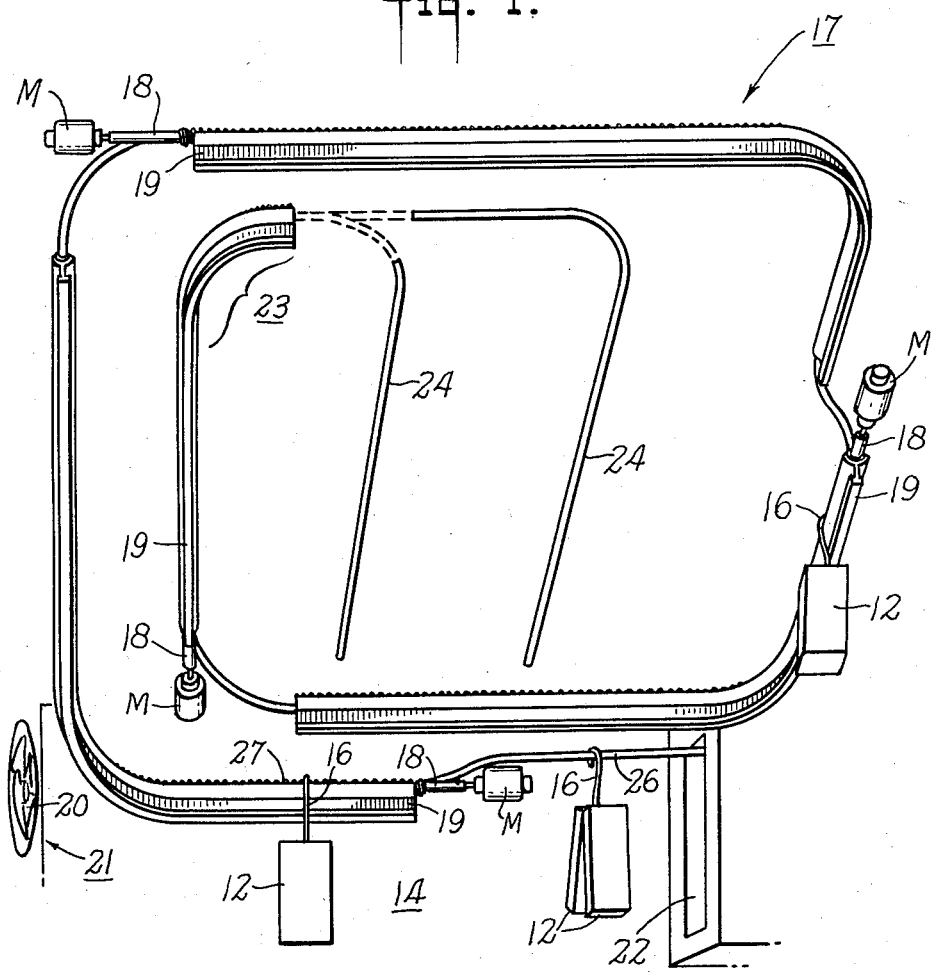
Fig. 1 is a perspective view of an ice-cream handling system embodying the invention.

Referring particularly to Fig. 1, groups of packages 12 containing ice-cream or the like to be frozen are led single file into a very cold room 14. The groups of packages are supported by hooks 16 which are suspended from an overhead conveyor 17 and are advanced along the conveyor, being held in spaced apart order during this advance, by a rotating drive-shaft 18 carried within the rail housing 19 of the conveyor. The packages are carried around the room counter to currents of air produced by fans 20 in air cooling units 21 and in this way are quickly and efficiently frozen.

The groups of packages are introduced into room 14 through a small door 22 and after completing their travel around the room, during which time they are subjected to a blast cooling effect and can be thoroughly frozen, are led to an unloading zone 23 for removal elsewhere. Alternatively, if further freezing is desired, or if they are to be stored for an extended period the packages are shunted to storage rails 24 and left to stand before unloading.

As indicated in Fig. 3, the packages are filled in a relatively warm production zone which is at a temperature comfortable for the workers, and are then loaded onto section 25 of the conveyor 17 and carried through door 22 into room 14. They are moved, for example, along section 25 of the rail at the rate of twelve feet per minute. After entering the room the groups of packages are transferred around corners and onto storage rails by simple gravity feed rail sections, for example, rail 26 between the powered section 25 of the conveyor 17 and the next powered section 27.

Since there is no part of the conveyor section 25 which advances into the cold room and then returns to the warm zone, there is no tendency for condensate to form and no danger of frost accumulating to cause freeze up of the system. Moreover, wasteful cooling of objects other than the packages themselves is held to a minimum.

Figure 2:
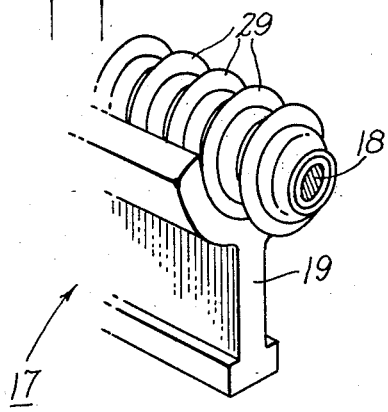
Fig. 2 is an enlarged perspective view of a short length of the conveyor rail and feed shaft used in this system.

Conveyor 17 is described and claimed in co-pending application, Serial No. 518,807, filed June 29, 1955. For completeness of the present description a short length of the rail is shown in Fig. 2. This conveyor consists of a flexible drive shaft 18 which is held in and carried by a rail housing 19. The helical shoulder or thread 29 of shaft 18 is adapted to engage the hooks 16 as they hang on the rail 19 and to push them forward as the shaft rotates. The weight of the groups of packages is carried through these hooks solely by the rail 19 and not by the shaft 18, so that the shaft turns freely. Conveyor 17 is able to turn 90° on a relatively short radius and can carry a very heavy load of packages. These facts are important to the success of the present invention.

Shaft 18 of conveyor is rotated by the various motors M positioned as shown in Fig. 3. By sub-dividing conveyor 17 into a number of shorter length powered sections, such as sections 25 and 27, the size motors required in a given system can be chosen as desired. Moreover some of these motors can be physically positioned in the cold room thereby eliminating any danger of their overheating. As mentioned previously, transfer from one powered rail section to the next can be accomplished by simple gravity feed rails such as rail 26. This last can be like rail 19 but minus shaft 18.

Figure 4:
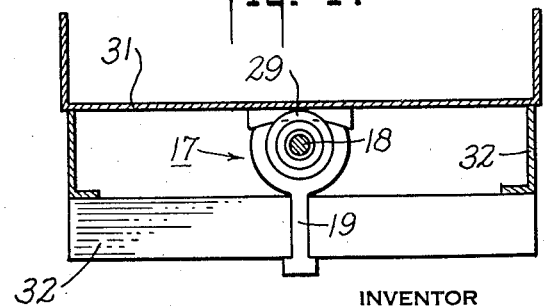

A particular advantage of the above described system is its ability to handle various kinds of products requiring different minimum freezing times. By increasing the speed of travel of the conveyor rail sections within room 14, the speed of freezing of the packages can be increased. Thus, for example, changeover from ice-cream production to production of ice-cream novelties and the like is possible simply by changing the drive speed of the motors M. Normally the production of the latter requires expensive additional equipment such as brine tanks, etc. It can be seen in Fig. 4 how easily conveyor 17 can be adapted to carry trays or the like, such as a tray 31, for holding the ice-cream novelties while they are being frozen. Tray 31 is supported on top of the conveyor by the arms 32, one on each side of rail 19 and attached thereto. Shaft 18 pushes tray 31 along the conveyor in the same way it pushes hooks 16, and the tray is supported entirely by the rail housing and not by the shaft.

The above description of the invention is intended in illustration and not in limitation thereof. Various changes may occur to those skilled in the art and these may be made without departing from the spirit or scope of the invention as set forth.

I claim:

1. A system for quickly freezing food packages comprising a production zone at roughly room temperature, a very cold hardening room at a much lower temperature, an overhead conveyor extending from said zone into and around said room, said conveyor being adapted to support a series of loads and to advance them in single file spaced apart relation from said production zone into and around said hardening room, said conveyor including a load supporting rail having a rotatable drive shaft recessed within it and adapted to advance the load along said rail, said conveyor being subdivided into powered sections with transfer between two of said sections.

2. The combination of elements as in claim 1 in which at least one powered section of said conveyor is driven by a motor positioned within said hardening room.

3. The combination of elements as in claim 2 in which at least some of said rails are supported near the top of said hardening room.

4. A system for quickly freezing food packages such as ice cream comprising a production zone at roughly room temperature, a very cold hardening room at a much lower temperature, an overhead conveyor extending from said zone into and around said room, said conveyor comprising at least one powered rail adapted to support groups of packages, said powered rail having a central cylindrical recess within it and a longitudinal slot along its top surface extending down to said recess, a helical drive shaft rotatably supported in said recess in said rail and adapted to be engaged by said hooks to frictionally propel them along said rail by a screw feeding action, and motor means to rotate said shaft at a given speed, whereby said packages can be advanced into said hardening room from said production zone with a minimum of lost time and can be conveyed along a serpentine path within said hardening room.

5. The combination of elements as in claim 4 in further combination with at least one storage rail the end of which is positioned adjacent and below said powered rail and is adapted to receive packages therefrom by gravity feed.

References Cited in the file of this patent

UNITED STATES PATENTS

| | | |
|---|---|---|
| 1,468,050 | Taylor | Sept. 18, 1923 |
| 1,787,681 | Hendron | Jan. 6, 1931 |
| 1,896,386 | Williams | Feb. 7, 1933 |
| 2,045,757 | Constantin | June 30, 1936 |
| 2,160,760 | Smith | May 30, 1939 |
| 2,259,007 | Story | Oct. 14, 1941 |
| 2,389,619 | Green | Nov. 27, 1945 |
| 2,404,885 | Pile | July 30, 1946 |
| 2,453,280 | Stewart | Nov. 9, 1948 |
| 2,486,876 | Protzeller | Nov. 1, 1949 |
| 2,487,408 | Askin | Nov. 8, 1949 |
| 2,531,087 | Tharaldsen | Nov. 21, 1950 |
| 2,597,066 | Chase | May 20, 1952 |
| 2,620,917 | Dahlberg | Dec. 9, 1952 |
| 2,685,176 | Berch | Aug. 3, 1954 |

FOREIGN PATENTS

| | | |
|---|---|---|
| 673,430 | Germany | Mar. 22, 1939 |
| 699,248 | Great Britain | Nov. 4, 1953 |
| 834,250 | Germany | Mar. 17, 1952 |